Patented Mar. 8, 1932

1,848,137

UNITED STATES PATENT OFFICE

ALFRED MILLER, OF BUFFALO, NEW YORK, ASSIGNOR TO TOWER MANUFACTURING CO., INC., A CORPORATION OF NEW YORK

PROCESS OF PURIFYING PARA-NITRANILINE

No Drawing. Original application filed July 14, 1925, Serial No. 43,618. Divided and this application filed June 5, 1928. Serial No. 283,138.

This invention relates to a new process of purifying or treating nitraniline, specifically para-nitraniline. In the manufacture of para-nitraniline from para-nitro-chlor-benzene with ammonia under pressure, certain by-products are formed, as described by Ullman, Enzyklopadie der technischen Chemie, Vol. 1, page 440, and these have the effect of causing a flocculent precipitate to form when the nitraniline is diazotized.

It is an object of this invention to prevent the formation of such precipitate and thus to purify the nitraniline by a suitable treatment with a reducing agent or its equivalent. In accomplishing this result I treat the nitraniline with either a neutral, acid or alkaline reducing agent in suitable proportions at an elevated temperature, as is more fully disclosed in the following examples and in my Patent No. 1,673,154, June 12, 1928, of which this application is a division.

One hundred and sixty parts of crude para-nitraniline are suspended in 2800 parts of water. 6½ to 8 parts of sodium sulphide crystals are dissolved in 200 parts of water and filtered free from any sediment which may be present. The solution of sodium sulphide is added to the suspension of para-nitraniline and the charge is heated up to 95° to 100° C. with constant agitation. It is then cooled to 40° to 45° C., filtered, and washed with water. The resulting para-nitraniline gives a clear diazo solution.

As a second example, I suspend 160 parts of crude para-nitraniline in 2500 parts of water, and then add a solution of ammonium sulphide containing 2 to 2½ parts of 100% ammonium sulphide. The liquid is heated to 90° to 100° C., thereafter cooled to 30° to 35° C., filtered, and washed well.

In these examples I have named mild reducing agents which reduce the nitro bodies or other impurities present but which do not affect the nitraniline molecule itself,—that is to say, there is no reduction of the $NO_2$ group attached to the benzene nucleus. The quantity of reducing agent employed is proportioned to the amount of impurity present. The process can be applied to nitraniline from whatsoever source derived and it may also be applied at any suitable point in the manufacture of nitraniline.

As various embodiments of the invention may be made without departing from the principle thereof it is to be understood that I do not limit myself to the foregoing embodiments except as defined in the following claims.

I claim:

1. The process consisting in treating a nitraniline derived from the treatment of nitro-chlor-benzine with ammonia and containing impurities more easily reduced than nitraniline with an alkaline sulphide to reduce the impurities without reducing the nitraniline.

2. The process consisting in treating para-nitraniline derived from the treatment of nitro-chlor-benzine with ammonia and containing impurities more easily reduced than para-nitraniline, with an alkaline sulphide to reduce the impurities without reducing the para-nitraniline.

3. The process consisting in treating a nitraniline derived from the treatment of nitro-chlor-benzine with ammonia and containing impurities more easily reduced than nitraniline, with an alkaline sulphide, heating the charge nearly to the boiling point, cooling, filtering and washing with water, whereby there is obtained a purified nitraniline.

4. The process consisting in treating para-nitraniline derived from the treatment of nitro-chlor-benzine with ammonia and containing impurities more easily reduced than the para-nitraniline with an alkaline sulphide, heating the charge nearly to the boiling point, cooling, filtering and washing with water, whereby there is obtained a purified para-nitraniline.

5. The process consisting in treating a nitraniline derived from the treatment of nitro-chlor-benzine with ammonia, in aqueous suspension with an alkaline sulphide solution heated nearly to the boiling point.

6. The process consisting in treating para-nitraniline derived from the treatment of nitro-chlor-benzine with ammonia, in aqueous suspension with an alkaline solution heated nearly to the boiling point.

7. In the manufacture of nitraniline from nitro-chlor-benzene with ammonia wherein certain by-products are formed which cause a flocculent precipitate upon diazotation, the process characterized in reducing said by-products by means of an alkaline sulphide in dilute solution.

8. In the manufacture of nitraniline from nitro-chlor-benzene with ammonia wherein certain by-products are formed which cause a flocculent precipitate upon diazotation, the process characterized by reducing said by-products with an alkaline sulphide in dilute aqueous solution, heating to a temperature below boiling and thereafter filtering off the solution from the nitraniline.

9. The process consisting in treating a nitraniline derived from the treatment of nitro-chlor-benzine with ammonia and containing impurities more easily reduced than the nitraniline, with sodium sulfide to reduce the impurities without reducing the nitraniline.

10. The process consisting in treating para-nitraniline derived from the treatment of nitro-chlor-benzine with ammonia and containing impurities more easily reduced than para-nitraniline, with sodium sulfide to reduce the impurities without reducing the para-nitraniline.

11. The process consisting in treating para-nitraniline derived from the treatment of nitro-chlor-benzine with ammonia and containing impurities more easily reduced than the para-nitraniline, with sodium sulfide, heating the charge nearly to the boiling point, cooling, filtering and washing with water, whereby there is obtained a purified para-nitraniline.

12. The process consisting in treating a nitraniline derived from the treatment of nitro-chlor-benzine with ammonia in aqueous suspension with sodium sulfide solution heated nearly to the boiling point.

13. In the manufacture of nitraniline from nitro-chlor-benzine with ammonia wherein certain by-products are formed which cause a flocculent precipitate upon diazotation, the process characterized in reducing said by-products by means of sodium sulfide in dilute solution.

In testimony that I claim the foregoing, I have hereunto set my hand this 29 day of May, 1928.

ALFRED MILLER.